US012560911B2

(12) United States Patent　　　　(10) Patent No.:　US 12,560,911 B2
Vurubindi et al.　　　　　　　　　　(45) Date of Patent:　　Feb. 24, 2026

(54) ACCELERATED RETURN TO STEADY STATE FOR CONTINUOUS MANUFACTURING PROCESSES

(71) Applicant: Yokogawa Electric Corporation, Tokyo (JP)

(72) Inventors: Venkata KrishnaPrasad Reddy Vurubindi, Andhra Pradesh (IN); Kumar Satyam, Bihar (IN); Lokesh Dwivedi, Madhya Pradesh (IN); Sanjay Venugopal, Karnataka (IN); Srinivas Ventrapragada, Karnataka (IN)

(73) Assignee: Yokogawa Electric Corporation, Tokyo (JP)

( * ) Notice: Subject to any disclaimer, the term of this patent is extended or adjusted under 35 U.S.C. 154(b) by 585 days.

(21) Appl. No.: 17/964,788

(22) Filed: Oct. 12, 2022

(65) Prior Publication Data

US 2024/0126243 A1　　　Apr. 18, 2024

(51) Int. Cl.
　G05B 19/418　　　(2006.01)
　G05B 13/02　　　(2006.01)

(52) U.S. Cl.
　CPC ..... G05B 19/41835 (2013.01); G05B 13/027 (2013.01); *G05B 2219/31372* (2013.01)

(58) Field of Classification Search
None
See application file for complete search history.

(56) References Cited

U.S. PATENT DOCUMENTS

| | | | | |
|---|---|---|---|---|
| 5,477,444 A | * | 12/1995 | Bhat | B01J 19/0033 |
| | | | | 700/48 |
| 5,570,282 A | * | 10/1996 | Hansen | G05B 13/026 |
| | | | | 706/23 |
| 5,832,468 A | * | 11/1998 | Miller | G05B 13/027 |
| | | | | 706/23 |
| 2004/0049299 A1 | | 3/2004 | Wojsznis et al. | |
| 2015/0198962 A1 | * | 7/2015 | Shiel | G05B 15/02 |
| | | | | 700/291 |
| 2015/0330022 A1 | | 11/2015 | Fu et al. | |

OTHER PUBLICATIONS

Yang "Operational Optimization of Crude Oil Distillation Systems with Limited Information," The University of Manchester, 2019, Thesis for the degree of Doctor of Philosophy in the Faculty of Science and Engineering, 226 pages [retrieved online from: pure. manchester.ac.uk/ws/portalfiles/portal/159372382/FULL_TEXT. PDF].

* cited by examiner

*Primary Examiner* — Sean Shechtman
(74) *Attorney, Agent, or Firm* — Sheridan Ross P.C.

(57) ABSTRACT
Certain manufacturing processes, such as crude oil refining, operate continuously, wherein a facility produces one product as the feed stock for that product changes and/or the output product transitions from one product to another. Inputs to the process include physical items (e.g., feed stock) as well as control inputs (e.g., temperature, pressure, etc.), and often a change in one affects one or more others. As a result, a facility may take time to reach a steady state. An artificial intelligence is provided to model the facility and process and generate a second command input to reduce the time required for the facility to reduce the lag time until the facility has returned to a steady state.

20 Claims, 7 Drawing Sheets

300

310

306

302

Input parameters

312

Second input parameters

314

Output paramters

316

Lag time

ACCELERATED RETURN TO STEADY STATE FOR CONTINUOUS MANUFACTURING PROCESSES

FIELD OF THE DISCLOSURE

The invention relates generally to systems and methods for controlling a continuous manufacturing process at a manufacturing facility and particularly to training and utilizing a machine-learning process to generate control inputs for reduction of time to return to a steady state.

BACKGROUND

Many manufacturing processes operate continuously and transition from one output product to another or strive to maintain a particular product when an input changes. Inputs may change due to a change in feed stock (e.g., physical composition, grade, temperature, pressure, impurities, etc.) or a change in the manufacturing process. The manufacturing process may change intentionally (e.g., utilize a different reaction vessel, shutting down a manufacturing component for maintenance, etc.) or unintentionally (e.g., a valve becomes stuck, a heating element fails, a leak occurs, etc.). When changing to a different output produced, the associated change in inputs may be the addition or increase of one or more inputs (e.g., feed stock grade, heat/cooling, pressure, etc.) and/or termination or decrease of other inputs. Other changes that lead to the production of a different output may include a change to an attribute of an input or to the process itself (e.g., temperature, pressure, timing of an operation, etc.). Changes in inputs that occur due to a change in feed stock, when the product produced remains constant, may include the addition, increasing, deletion, or decreasing of other physical inputs (e.g., feed stock, flocculation agent, catalyst, etc.) and/or processes (e.g., filtration, settling, heating, cooling, pressurizing, reaction time, etc.).

A transition occurs when the desired output changes from a first output to a second output or when an input changes and steps are taken to maintain or return to producing the same output. During the transition, the outputs produced may be discarded, reprocessed, absorbed into one or both of the first or second outputs, or subject to other processes. However, it is generally desirable to know the shortest time period from the start of the transition until the process has reached a steady state and the second product is reliably being produced with minimal alterations in the inputs.

Reaching a steady state may be complicated by changes in properties of feed stock. For example, an input may be at a different temperature or pressure or have a different level or type of impurities that affect the process. Other processes may be affected by the temperature, pressure, and humidity of the atmosphere. The physical properties of most substances require the balancing of temperature and pressure. Maintaining a reaction at a particular temperature may cause an undesired increase in pressure or vice versa. The combinatorics of inputs and their properties, as well as the reaction chamber's target and actual operational properties and its response to the inputs, often complicate and delay obtaining a steady state in a continuous manufacturing process.

SUMMARY

Many manufacturing processes operate with a core portion of the process operating continually even while the process transitions from the production of one product to another or when an input changes and process maintains, or nearly so, production of the same output. Such processes, which include but are not limited to crude oil distillation, maintain operation of at least a portion of the processing equipment, such as a crude oil distillation unit (CDU), and alter the inputs and/or the operation of the processing equipment. For example, requiring the production to change to a different output or maintain a particular output may require a change in the inputs themselves and/or the equipment as the production transitions from one input feed stock to another or a first product to a second product. The transition may include any of the timing of when to add an input feed stock (e.g., when to open a valve, when to start a conveyer, selecting an injection port for inclusion of an input at an earlier stage of the reaction or a different port for inclusion at a later stage of the reaction, etc.), the equipment or the characteristics of the inputs (e.g., temperature, pressure, volume, feed composition, etc.), transition-specific inputs/settings, or combinations thereof. In addition, the equipment conditions or process conditions may have to be altered to respond to variations in attributes of the inputs (e.g., grade, specific impurities, input temperature, input pressure, etc.). Changes in any one input may affect one or more attributes of the outputs (e.g. product quality). For example, an increase in volume of an input may require the equipment to increase heating, but the additional heat may create an unwanted increase in pressure. As one attribute changes, another may respond and need to be managed. Quickly and effectively transitioning from one output to another or maintaining the output and transitioning from one input (e.g., feed grade) to another would reduce the time and intermittent product produced and therefore improve efficiency of the manufacturing process and reduce waste.

These and other needs are addressed by the various embodiments and configurations of the present invention. The present invention can provide a number of advantages depending on the particular configuration. These and other advantages will be apparent from the disclosure of the invention(s) contained herein.

Exemplary aspects are directed to:

A method for optimizing input feed change to a manufacturing process, the method comprising: receiving a first set of input controls, wherein the first set of input controls include a first input feed change; receiving a first set of output parameters, wherein the first set of output parameters correspond to the first set of input controls; determining at least one lag time-period between a first input feed change and reaching a steady state, for the first set of input controls associated with one or more first set of output parameters, wherein the at least one lag time-period comprises a time period taken by the first set of input controls to impact the first set of output parameters during a period of transition to the steady state; and utilizing a model to generate a second set of input controls during a second input feed change to reduce a new period of transition to the steady state, wherein the model utilizes a second set of output parameters to generate the second set of input controls.

A system, comprising: a non-transitory machine-readable medium storing instructions of a model; and one or more processors that, upon reading the instructions, cause the one or more processors to execute the instructions to perform: determining at least one lag time-periods between a first input feed change and reaching a steady state for a manufacturing process, for a first set of input controls associated with one or more of a first set of output parameters, wherein each of the at least one lag time-periods comprises a time period taken by the first set of input controls to change the one or more first set of output parameters to cause the transition to the steady state; utilizing a model to generate a second set of input controls during a second input feed change to reduce time taken to reach the steady state, wherein the model utilizes a second set of output parameters to generate a second set of input controls; and displaying the second set of input controls on a user interface.

A system, comprising: a processor; and computer memory coupled to the processor, wherein the computer memory comprises data stored thereon that, when processed by the processor, enables the processor to: receive data from one or more sensors during an input feed change; provide the data received from the one or more sensors to a machine learning model trained to generate a set of input controls for an industrial system during the input feed change, wherein the set of input controls facilitate a reduction in time for the industrial system to reach a steady state during the input feed change; receive an output from the machine learning model, wherein the output comprises a result produced by the machine learning model after processing the data received from the one or more sensors; and provide the output to a controller of the industrial system, thereby enabling the controller to implement the set of input controls for the industrial system during the input feed change.

A system on a chip (SoC) including any one or more of the above aspects of the embodiments described herein.

One or more means for performing any one or more of the above aspects of the embodiments described herein.

Any aspect in combination with any one or more other aspects.

Any one or more of the features disclosed herein.

Any one or more of the features as substantially disclosed herein.

Any one or more of the features as substantially disclosed herein in combination with any one or more other features as substantially disclosed herein.

Any one of the aspects/features/embodiments in combination with any one or more other aspects/features/embodiments.

Use of any one or more of the aspects or features as disclosed herein.

Any of the above aspects, wherein the data storage comprises a non-transitory storage device, which may further comprise at least one of: an on-chip memory within the processor, a register of the processor, an on-board memory co-located on a processing board with the processor, a memory accessible to the processor via a bus, a magnetic media, an optical media, a solid-state media, an input-output buffer, a memory of an input-output component in communication with the processor, a network communication buffer, and a networked component in communication with the processor via a network interface.

It is to be appreciated that any feature described herein can be claimed in combination with any other feature(s) as described herein, regardless of whether the features come from the same described embodiment.

The phrases "at least one," "one or more," "or," and "and/or" are open-ended expressions that are both conjunctive and disjunctive in operation. For example, each of the expressions "at least one of A, B, and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B, and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible, non-transitory medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "means" as used herein shall be given its broadest possible interpretation in accordance with 35 U.S.C., Section 112(f) and/or Section 112, Paragraph 6. Accordingly, a claim incorporating the term "means" shall cover all structures, materials, or acts set forth herein, and all of the equivalents thereof. Further, the structures, materials or acts and the equivalents thereof shall include all those described in the summary, brief description of the drawings, detailed description, abstract, and claims themselves.

The preceding is a simplified summary of the invention to provide an understanding of some aspects of the invention. This summary is neither an extensive nor exhaustive overview of the invention and its various embodiments. It is intended neither to identify key or critical elements of the invention nor to delineate the scope of the invention but to present selected concepts of the invention in a simplified form as an introduction to the more detailed description presented below. As will be appreciated, other embodiments of the invention are possible utilizing, alone or in combination, one or more of the features set forth above or described in detail below. Also, while the disclosure is presented in terms of exemplary embodiments, it should be appreciated that an individual aspect of the disclosure can be separately claimed.

BRIEF DESCRIPTION OF THE DRAWINGS

The present disclosure is described in conjunction with the appended figures:

FIG. 3 depicts a manufacturing system in accordance with embodiments of the present disclosure;

DETAILED DESCRIPTION

The ensuing description provides embodiments only and is not intended to limit the scope, applicability, or configuration of the claims. Rather, the ensuing description will provide those skilled in the art with an enabling description for implementing the embodiments. It will be understood that various changes may be made in the function and arrangement of elements without departing from the spirit and scope of the appended claims.

Any reference in the description comprising a numeric reference number, without an alphabetic sub-reference identifier when a sub-reference identifier exists in the figures, when used in the plural, is a reference to any two or more elements with the like reference number. When such a reference is made in the singular form, but without identification of the sub-reference identifier, it is a reference to one of the like numbered elements, but without limitation as to the particular one of the elements being referenced. Any explicit usage herein to the contrary or providing further qualification or identification shall take precedence.

The exemplary systems and methods of this disclosure will also be described in relation to analysis software, modules, and associated analysis hardware. However, to avoid unnecessarily obscuring the present disclosure, the following description omits well-known structures, components, and devices, which may be omitted from or shown in a simplified form in the figures or otherwise summarized.

For purposes of explanation, numerous details are set forth in order to provide a thorough understanding of the present disclosure. It should be appreciated, however, that the present disclosure may be practiced in a variety of ways beyond the specific details set forth herein.

Figure 1:
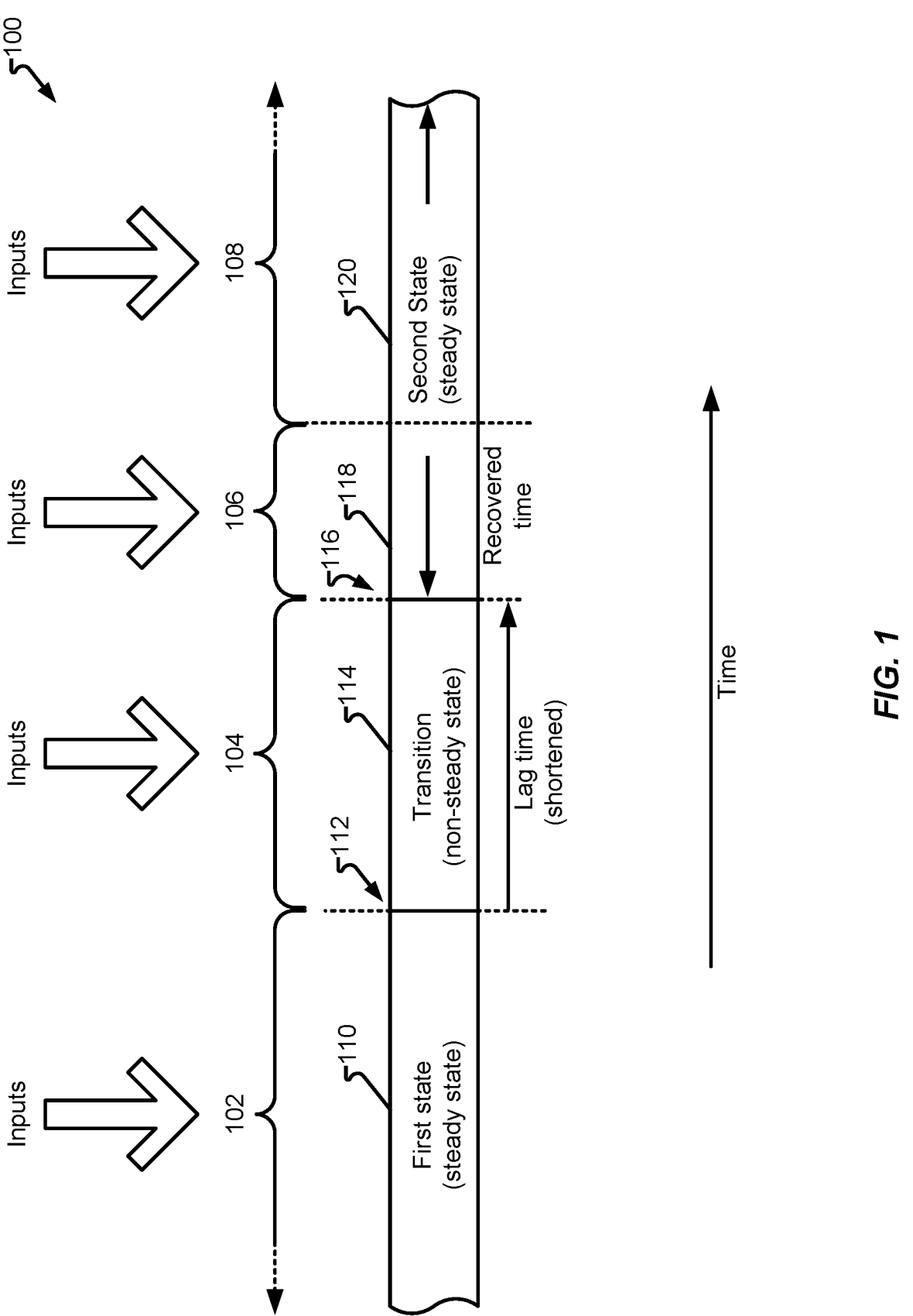
FIG. 1 depicts a process flow in accordance with embodiments of the present disclosure.

FIG. 1 depicts process 100 in accordance with embodiments of the present disclosure. In one embodiment, and at a first time, a continuous manufacturing process is in first state 110. First state 110 is a steady state. A steady state is variously embodied and generally is present when the continuous manufacturing process produces the desired output product and/or operates with values for those properties necessary to produce the desired product, and does not have any of the values that fall outside of a given range and/or do not fall outside of a given range for more than an allowable period of time. The values may be determined by properties of a reaction wherein feed stock is converted into an output product. The value of the reaction may be one or more of temperature, pressure, mass (e.g., no mass accumulating or depleting), specific gravity, purity, electrical conductivity, electrical capacitance, viscosity, pH, color, etc. Obtaining a steady state often requires a number of values to be within their respective acceptable range for a previously determined period of time. For example, changing the temperature in a pressure vessel utilized to react feed stock will cause a change in pressure. If the temperature-pressure combination must be within a certain range, then it may be necessary to change the pressure in response to a change in temperature. This may cause the value for the temperature and/or pressure to vary unacceptably and/or stray outside a threshold range (i.e., a non-steady state). It is generally desirable to maintain a steady state and, if in a non-steady state, return to a steady state as quickly as possible as the products produced by the continuous manufacturing process, when not in a steady state, may require additional processing, disposal, or, if added to other products, dilute the quality of the other products.

Process 100, at first state 110, may be idle or producing one or more products from the continuous manufacturing process from inputs 102. Inputs 102, and similarly inputs 104, inputs 106, and inputs 108, comprise physical inputs (e.g., feed stock) and/or control inputs, such as heat and pressure used to affect a chemical reaction of the feed stock, rate a feed stock(s) is fed into a reaction vessel, mean time within the reaction vessel, etc. Input control 112 occurs and the continuous manufacturing process starts transition 114. There are three embodiments, wherein input control 112 occurs. In one embodiment, input feed stock changes at 112 to start the transition of the continuous manufacturing process to a different process requiring a change in feed stock and/or processes. In a second embodiment, the feed stock inputs are unchanged but input control 112 may be a deliberate, induced, or even unwelcome change that, unless addressed, would produce a different product when producing the same product is intended. For example, inputs 104 may change (e.g., a heating element in a reaction vessel fails; a tank of feed stock held at one temperature was switched to a different tank held at a different temperature; a piece of equipment utilized for the continuous manufacturing process is taken offline for maintenance while a functionally similar, but not identical, replacement component is utilized; etc.). In a third embodiment, input control 112 is a change in an attribute of an input feed stock to produce the same output. For example, a feed stock may change such as a first grade of crude oil may be exhausted and the input control 112 begins to utilize a second grade of crude oil.

Input control 112 is performed to initiate the continuous manufacturing process to either maintain deliberately change to producing a second product or to produce the same product and mitigate the production of a second product as a result of input control 11, in second state 120. Inputs 104, may include stopping/starting a particular feed stock or amount thereof, changing an input control affecting temperature/pressure, use/termination of a catalyst, etc. During transition 114 the continuous manufacturing process is in a non-steady state due to the continuous manufacturing process not producing the desired product and/or values for the continuous manufacturing process fluctuating beyond an acceptable range and/or beyond an acceptable duration.

For a particular continuous manufacturing process (e.g., type of process, specific equipment utilized, feed stock attribute, environmental factors, etc.), the time to reach a steady state (e.g., steady state 120) may be reduced by applying second input control 116. As a result, second state 120 may include recovered time 118, wherein recovered time 118 is the difference between the time to reach second state 120 with second input control 116 versus without second input control 116. The particular second input control 116 may be determined by an artificial intelligence, such as an artificial neural network, which will be described more completely with respect to the embodiments that follow. In another embodiment, the second input control 116 may be determined by a machine learning model such as lasso regression.

Figure 2:
FIG. 2 depicts a graph for a continuous manufacturing process in accordance with embodiments of the present disclosure.

FIG. 2 depicts graph 200 for a continuous manufacturing process in accordance with embodiments of the present disclosure. In one embodiment a continuous manufacturing process comprises value 202 for a state attribute, plotted along axis 204 over time axis 206. As described above, the state attribute may be a pressure, temperature, etc. The continuous manufacturing process may be in a first steady state until time 208, such as the occurrence of a transition from one product to another, a change in an attribute of a reaction vessel, a change in an attribute of feed stock, etc. As a result, value 202 enters a non-steady state, such as going above high-threshold 210 and/or below low-threshold 212 of steady state range 214. In one embodiment, once value 202 is consistently within steady state range 214, the continuous manufacturing process has reached steady state 218. In another embodiment, minor (e.g., below a threshold amount, duration, and/or number of occurrence thereof) outside of steady state range 214 may be permitted, such as peak 216, for a particular continuous manufacturing process.

Figure 3:
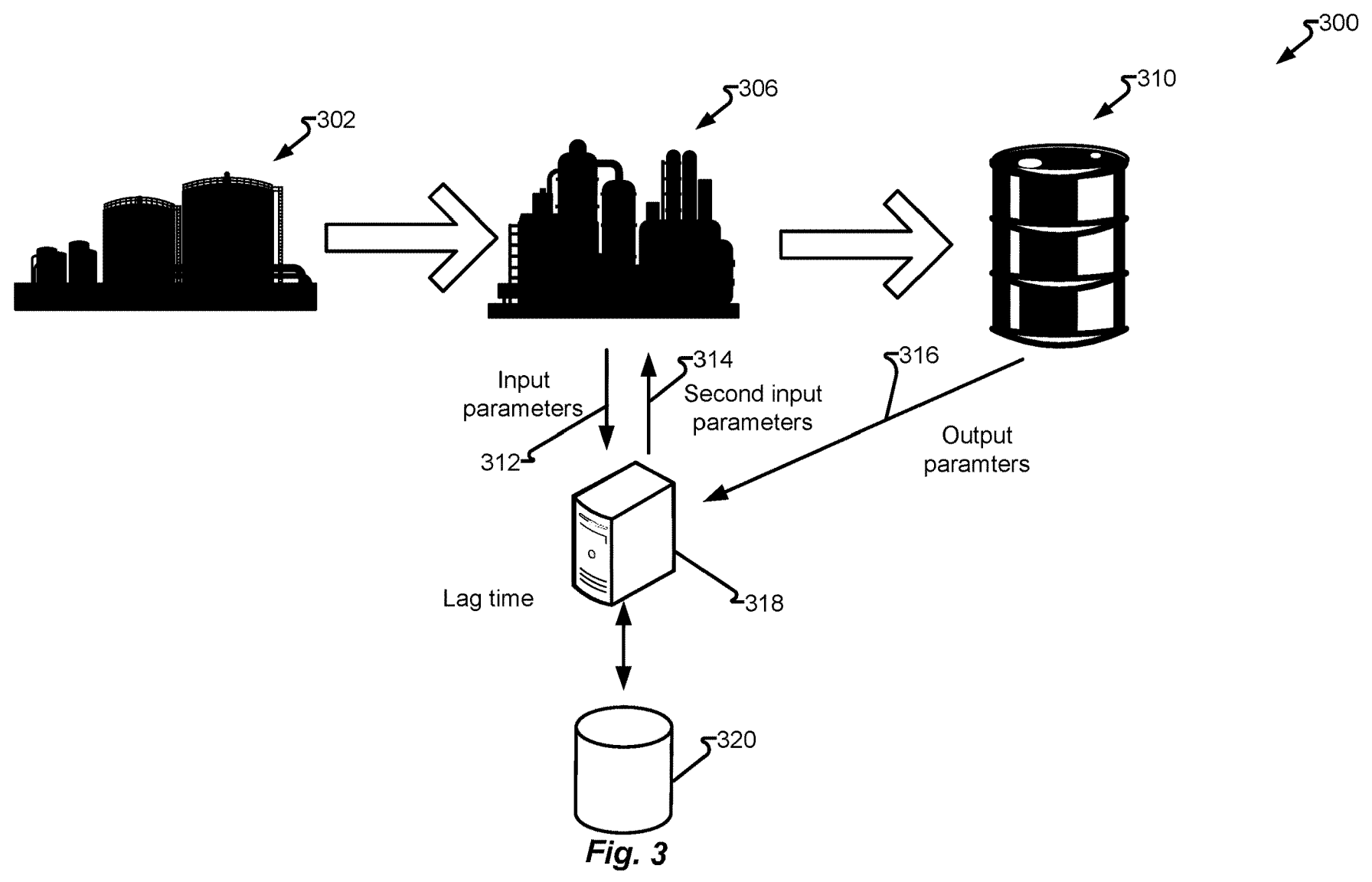

FIG. 3 depicts manufacturing system 300 in accordance with embodiments of the present disclosure. It should be appreciated that embodiments herein utilize oil refining as one example of a continuous manufacturing process that may implement the embodiments disclosed. Certain pharmaceutical, chemical, and other manufacturing processes may similarly benefit from the embodiments disclosed herein.

In one embodiment, feed stock input 302 is provided to manufacturing facility 306 to produce product 310. In addition, manufacturing facility 306 provides control inputs (e.g., temperature, pressure, rate of feed, etc.) to produce product 310 from feed stock input 302.

In another embodiment, computer 318 receives input parameters 312, such as those used to place manufacturing facility 306 in a steady state. Additionally, output parameters 316 are obtained, such as to determine the lag time between execution of a particular input parameter 312 and reaching a steady state to produce the particular product 310. It should be appreciated that output parameters 316 may be obtained from other sources, such as manufacturing facility 306.

Computer 318 may access data storage 320 which maintains historic records of prior input parameters 312 and/or historic records for other processes (e.g., processes at other facilities, different processes, etc.). Data storage 320 preferably maintains a large number of historic records which identify the particular input parameters, particular changes in the input parameters, and time to reach a steady state after the change in the input parameters.

Computer 318 comprises at least one processor with non-transitory computer memory maintaining instructions therein that, when ready by the at least one processor, executes the instructions. Computer 318 may further comprise input-output components to receive and present content to a user. Computer 318 may determine a lag time associated with second input parameters 314 based, in whole or in part, on records maintained in data storage 320. In one embodiment, the instructions provide attributes of manufacturing facility 306, feed stock inputs 302, input parameters 312, and/or historic values of output parameters 316 from data storage 320 to an artificial neural network trained to determine second input parameters 314 that optimize the lag time. Optimization generally comprises determining the shortest time to reach steady state, but in other embodiments optimization may comprise optimizing lag time as any of one or more of the least energy required, least wasteful (e.g., produce the least amount of nonconforming product or byproduct), least risky (e.g., avoiding situations where an operational limit of manufacturing facility 306 could be exceeded), least use of a particular feed stock 302, etc., before reaching the steady state.

An artificial neural network, as is known in the art and in one embodiment, self-configures layers of logical nodes having an input and an output. If an output is below a self-determined threshold level, the output is omitted (i.e., the inputs are within the inactive response portion of a scale and provide no output). If the self-determined threshold level is above the threshold, an output is provided (i.e., the inputs are within the active response portion of a scale and provide an output). The particular placement of the active and inactive delineation is provided as a training step or steps. Multiple inputs into a node produce a multi-dimensional plane (e.g., hyperplane) to delineate a combination of inputs that are active or inactive.

Figure 4A:
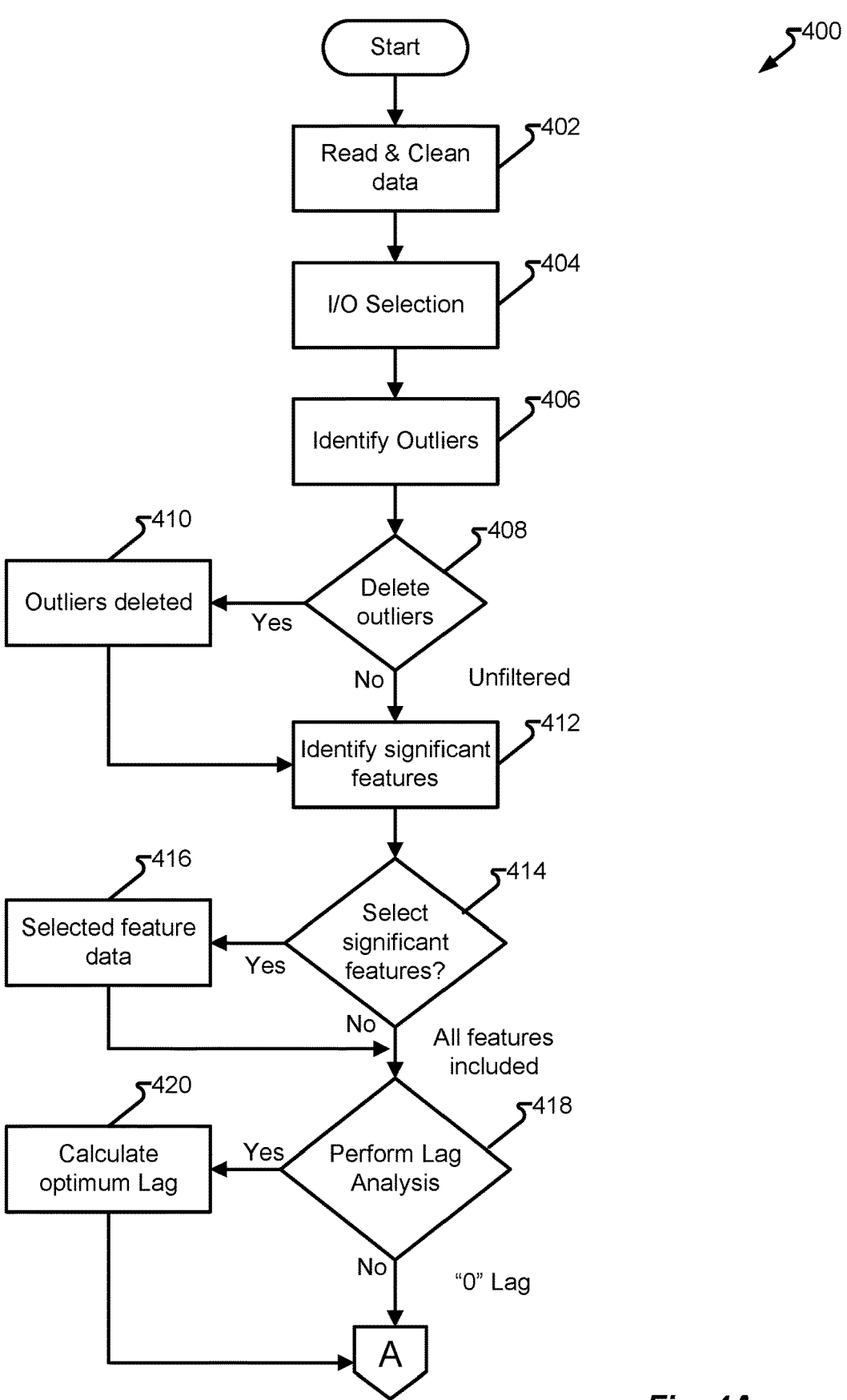
FIG. 4A and FIG. 4B depict a process in accordance with the present disclosure.
Figure 4B:
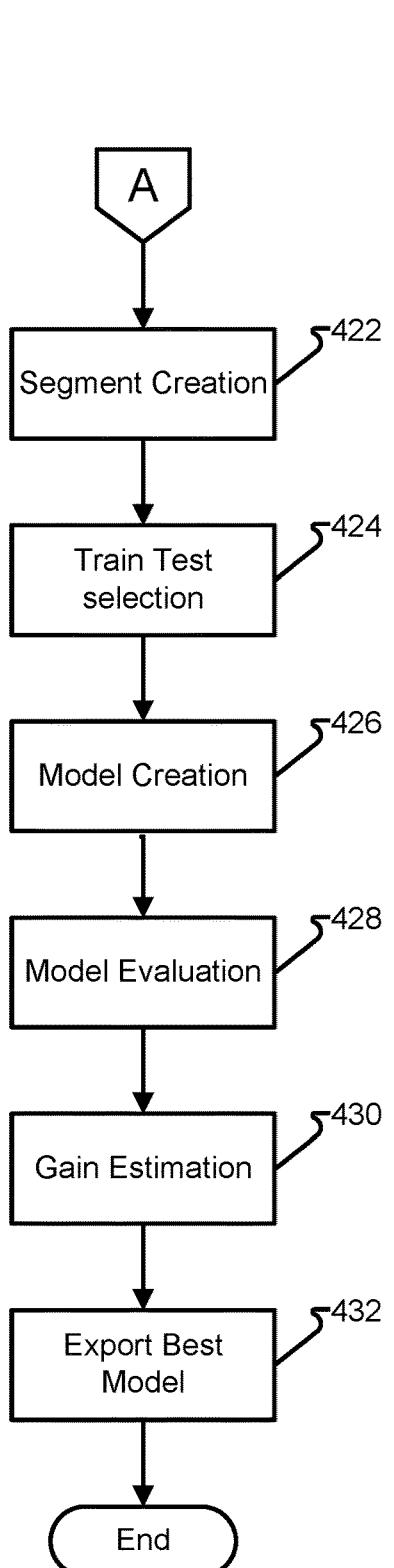

FIGS. 4A-4B depict process 400 in accordance with embodiments of the present disclosure. In one embodiment, process 400 is embodied as machine-readable instructions maintained in a non-transitory memory that when read by a machine, such as processors of a server, cause the machine to execute the instructions and thereby execute process 400. The processor of the server may include, but is not limited to, at least one processor of computer 318.

In one embodiment, process 400 begins and, in step 402, reads data from a data file. Optionally, step 402 cleans the data wherein incorrect, corrupt, and/or inaccurate data records are corrected or deleted. Values corrected may be, for example, not-a-number (NaN) values of a record and replaced with a mean, median, or mode of similar values from other records. Step 404 performs input-output selection wherein independent and dependent data fields are identified. Step 406 identifies outliers. Similar to the methodology used to clean the data in step 402, wildly different values may indicate a data sensing error or an unrepeatable series of events. The determination of whether a particular value is an outlier is variously embodied. In one embodiment, 3-Sigma method is utilized wherein any value that is more than three standard deviations from similar data is an outlier; in another embodiment, interquartile range is utilized, which utilizes median value to determine quartile ranges to identify outliers, such as values within the first and fourth quartile;

and in another embodiment, manual outlier identification is utilized, which may be prompted by system-determined identification of an outlier or manually selected. Test 408 determines if the outlier values are to be deleted and, if determined in the affirmative, deleted in step 410. Otherwise, if test 408 is determined in the negative, processing continues with the unfiltered data.

Step 412 identifies significant features and test 414 determines if significant features are to be selected and, if determined in the affirmative, the significant features data are selected in step 416; otherwise all features are included for further processing. Feature selection is variously embodied and may include variable section, attribute selection, and/or variable subset selection. The selection process identifies relevant features (e.g., variables, predictors) for use in constructing a model. As a benefit, feature selection can make a model simpler, shorten training times, avoid the "curse of dimensionality," and reduce overfitting. Feature selection may be implemented in any of one or more of stepwise regression, using adjusted r-square with stepwise regression to identify significant features; recursive feature elimination (RFE); lasso regression; variance influence factor (VIF) to eliminate multicollinear variables, mutual information (MI), and/or manual selection.

Test 418 determines if lag analysis is to be performed and, if determined in the affirmative, the analysis calculates the optimum lag in step 420. Lag analysis may be performed using linear regression with an adjusted r-squared metric to identify the optimal lag value for each input variable. In one embodiment, t is the change in time and t−1 is the period of input. t+1 is a function of t and t−1 is a function of the output values. All variable time series may be modeled for the input variables. Each variable has different effects, some taking effect sooner and some later. Modeling may then determine the ideal lag period for each variable.

Step 422 (shown in FIG. 4B) creates data segments. Data segmentation takes the data being evaluated and divides it up into groups of similar data based on a chosen parameter (s). The data contains various excitation regions throughout the process and segment creation, such as by using k-means.

Test 424 trains test selection. Testing of the data may be split, such as a random or manual number or percentage of data used for a test and the remainder used as a control. Similarly, a time can be manually or randomly selected. Step 426 then creates the model. Linear data may be fit to a linear model and non-linear data fit to a non-linear model. For example, if the difference in a feed stock, such as a particular batch of crude oil, leads to a non-linear output, then more than one crude oil data set may be included such as to account for the difference in composition between the crude sources. A particular input value for the transition may produce better results (e.g., steady state) sooner than would input value utilized before and after the transition. Step 428 evaluates the model, such as by plotting and evaluating the output results (e.g., time to reach a steady state). Step 430 estimates the potential gain, such as to determine the output difference effected by a particular unit of change in an input. Step 432 exports the best model such as to be utilized by a manufacturing facility.

Figure 5:
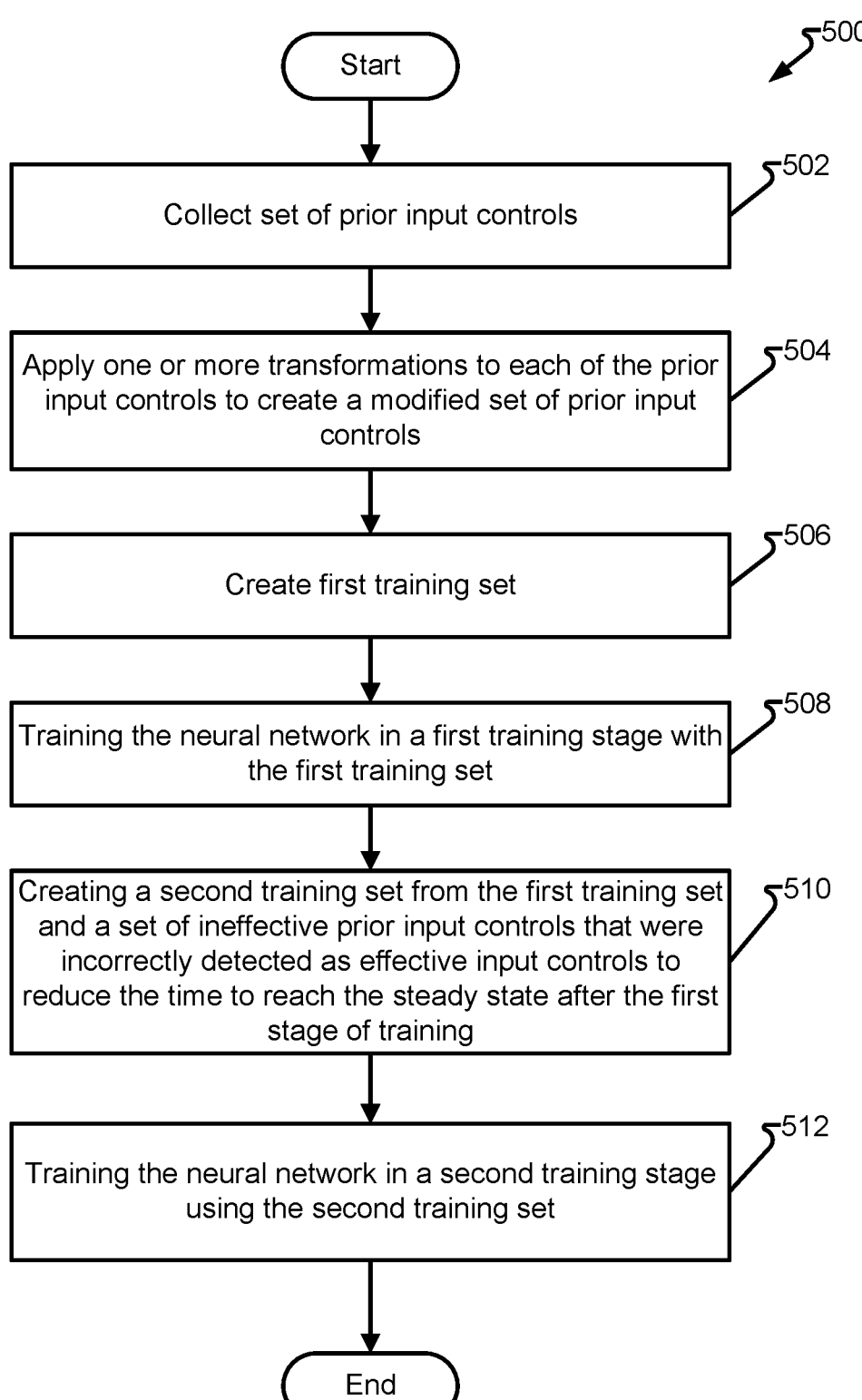
FIG. 5 depicts a process in accordance with the present disclosure.

FIG. 5 depicts process 500 in accordance with embodiments of the present disclosure. In one embodiment, process 500 is embodied as machine-readable instructions that, when read by a processor such as a processor of computer 318, cause the machine to perform process 500. Process 500 begins and, in step 502, a set of prior input controls are collected. Examples of prior input controls include input parameters 312 (see FIG. 3) and inputs obtained from other manufacturing processes which may comprise the same facility (e.g., manufacturing facility 306 of FIG. 3) or a different facility.

Step 504 applies one or more transformations to each input control of the prior input controls, including removing at least one prior input, adding an additional input, altering the timing of at least one prior input, altering a value of at least one input, changing the order of two or more inputs, to create a modified set of prior input controls. Step 506 creates a first training set comprising the collected set of prior input controls, the modified set of prior input controls, and a set of ineffective prior input controls that failed to reduce the time to reach the steady state. The artificial neural network is then trained in a first training stage with the first training set in step 508. In another embodiment of the present invention, one or more machine learning models such as stepwise regression, recursive feature elimination, lasso regression, variance influence factor, and mutual information algorithm are used to train the machine learning models. The machine learning model may be trained with the first training set.

Step 510 creates a second training set for a second stage of training comprising the first training set and a set of ineffective prior input controls that were incorrectly detected as effective input controls to reduce the time to reach the steady state after the first stage of training. Step 512 then trains the artificial neural network in the second training stage using the second training set.

It should be appreciated that subsequent training may be performed on an intermittent or continual basis. For example, providing control inputs to the artificial neural network and receiving therefrom a second control input, which then produces the desired reduction in lag time to reach a steady state, may be enforced, such as up-weighted, to cause the artificial neural network to be more likely to recommend the same or similar second command inputs again when provided with the same or similar control inputs. Conversely, providing control inputs to the artificial neural network and receiving therefrom a second control input, which then fails to produce the desired reduction in lag time to reach a steady state, may be de-emphasized, such as down-weighted, to cause the artificial neural network to be less likely to recommend the same or similar second command inputs again when provided with the same or similar control inputs.

Figure 6:
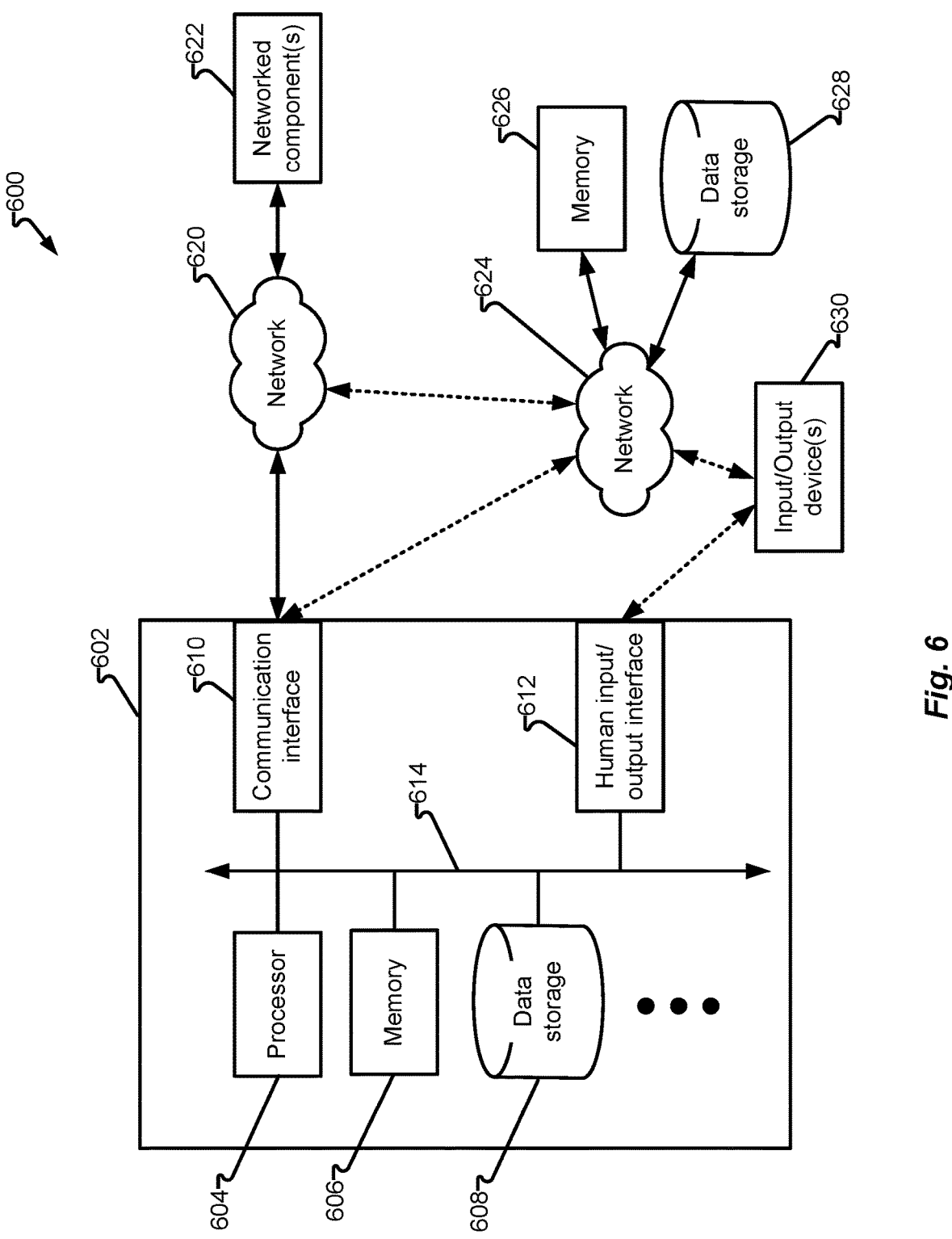
FIG. 6 depicts a system in accordance with the present disclosure.

FIG. 6 depicts device 602 in system 600 in accordance with embodiments of the present disclosure. In one embodiment, computer 318 may be embodied, in whole or in part, as device 602 comprising various components and connections to other components and/or systems. The components are variously embodied and may comprise processor 604. The term "processor," as used herein, refers exclusively to electronic hardware components comprising electrical circuitry with connections (e.g., pin-outs) to convey encoded electrical signals to and from the electrical circuitry. Processor 604 may comprise programmable logic functionality, such as determined, at least in part, from accessing machine-readable instructions maintained in a non-transitory data storage, which may be embodied as circuitry, on-chip read-only memory, computer memory 606, data storage 608, etc., that cause the processor 604 to perform the steps of the instructions. Processor 604 may be further embodied as a single electronic microprocessor or multiprocessor device (e.g., multicore) having electrical circuitry therein which may further comprise a control unit(s), input/output unit(s), arithmetic logic unit(s), register(s), primary memory, and/or other components that access information (e.g., data, instructions, etc.), such as received via bus 614, executes instructions, and outputs data, again such as via bus 614. In other embodiments, processor 604 may comprise a shared processing device that may be utilized by other processes and/or process owners, such as in a processing array within a system (e.g., blade, multi-processor board, etc.) or distributed processing system (e.g., "cloud", farm, etc.). It should be appreciated that processor 604 is a non-transitory computing device (e.g., electronic machine comprising circuitry and connections to communicate with other components and devices). Processor 604 may operate a virtual processor, such as to process machine instructions not native to the processor (e.g., translate the VAX operating system and VAX machine instruction code set into Intel® 9xx chipset code to enable VAX-specific applications to execute on a virtual VAX processor). However, as those of ordinary skill understand, such virtual processors are applications executed by hardware, more specifically, the underlying electrical circuitry and other hardware of the processor (e.g., processor 604). Processor 604 may be executed by virtual processors, such as when applications (i.e., Pod) are orchestrated by Kubernetes. Virtual processors enable an application to be presented with what appears to be a static and/or dedicated processor executing the instructions of the application, while underlying non-virtual processor(s) are executing the instructions and may be dynamic and/or split among a number of processors.

In addition to the components of processor 604, device 602 may utilize computer memory 606 and/or data storage 608 for the storage of accessible data, such as instructions, values, etc. Communication interface 610 facilitates communication with components, such as processor 604 via bus 614 with components not accessible via bus 614. Communication interface 610 may be embodied as a network port, card, cable, or other configured hardware device. Additionally or alternatively, human input/output interface 612 connects to one or more interface components to receive and/or present information (e.g., instructions, data, values, etc.) to and/or from a human and/or electronic device. Examples of input/output devices 630 that may be connected to input/output interface include, but are not limited to, keyboard, mouse, trackball, printers, displays, sensor, switch, relay, speaker, microphone, still and/or video camera, etc. In another embodiment, communication interface 610 may comprise, or be comprised by, human input/output interface 612. Communication interface 610 may be configured to communicate directly with a networked component or configured to utilize one or more networks, such as network 620 and/or network 624.

Network 620 may be a wired network (e.g., Ethernet), wireless (e.g., WiFi, Bluetooth, cellular, etc.) network, or combination thereof and enable device 602 to communicate with networked component(s) 622. In other embodiments, network 620 may be embodied, in whole or in part, as a telephony network (e.g., public switched telephone network (PSTN), private branch exchange (PBX), cellular telephony network, etc.).

Additionally or alternatively, one or more other networks may be utilized. For example, network 624 may represent a second network, which may facilitate communication with components utilized by device 602. For example, network 624 may be an internal network to a business entity or other organization, whereby components are trusted (or at least more so) than networked components 622, which may be connected to network 620 comprising a public network (e.g., Internet) that may not be as trusted.

Components attached to network 624 may include computer memory 626, data storage 628, input/output device(s) 630, and/or other components that may be accessible to processor 604. For example, computer memory 626 and/or data storage 628 may supplement or supplant computer memory 606 and/or data storage 608 entirely or for a particular task or purpose. As another example, computer memory 626 and/or data storage 628 may be an external data repository (e.g., server farm, array, "cloud," etc.) and enable device 602, and/or other devices, to access data thereon. Similarly, input/output device(s) 630 may be accessed by processor 604 via human input/output interface 612 and/or via communication interface 610 either directly, via network 624, via network 620 alone (not shown), or via networks 624 and 620. Each of computer memory 606, data storage 608, computer memory 626, data storage 628 comprise a non-transitory data storage comprising a data storage device.

It should be appreciated that computer readable data may be sent, received, stored, processed, and presented by a variety of components. It should also be appreciated that components illustrated may control other components, whether illustrated herein or otherwise. For example, one input/output device 630 may be a router, a switch, a port, or other communication component such that a particular output of processor 604 enables (or disables) input/output device 630, which may be associated with network 620 and/or network 624, to allow (or disallow) communications between two or more nodes on network 620 and/or network 624. One of ordinary skill in the art will appreciate that other communication equipment may be utilized, in addition or as an alternative, to those described herein without departing from the scope of the embodiments.

In the foregoing description, for the purposes of illustration, methods were described in a particular order. It should be appreciated that in alternate embodiments, the methods may be performed in a different order than that described without departing from the scope of the embodiments. It should also be appreciated that the methods described above may be performed as algorithms executed by hardware components (e.g., circuitry) purpose-built to carry out one or more algorithms or portions thereof described herein. In another embodiment, the hardware component may comprise a general-purpose microprocessor (e.g., CPU, GPU) that is first converted to a special-purpose microprocessor. The special-purpose microprocessor then having had loaded therein encoded signals causing the, now special-purpose, microprocessor to maintain machine-readable instructions to enable the microprocessor to read and execute the machine-readable set of instructions derived from the algorithms and/or other instructions described herein. The machine-readable instructions utilized to execute the algorithm(s), or portions thereof, are not unlimited but utilize a finite set of instructions known to the microprocessor. The machine-readable instructions may be encoded in the microprocessor as signals or values in signal-producing components by, in one or more embodiments, voltages in memory circuits, configuration of switching circuits, and/or by selective use of particular logic gate circuits. Additionally or alternatively, the machine-readable instructions may be accessible to the microprocessor and encoded in a media or device as magnetic fields, voltage values, charge values, reflective/non-reflective portions, and/or physical indicia.

In another embodiment, the microprocessor further comprises one or more of a single microprocessor, a multi-core processor, a plurality of microprocessors, a distributed processing system (e.g., array(s), blade(s), server farm(s), "cloud", multi-purpose processor array(s), cluster(s), etc.) and/or may be co-located with a microprocessor performing other processing operations. Any one or more microprocessors may be integrated into a single processing appliance (e.g., computer, server, blade, etc.) or located entirely, or in part, in a discrete component and connected via a communications link (e.g., bus, network, backplane, etc. or a plurality thereof).

Examples of general-purpose microprocessors may comprise, a central processing unit (CPU) with data values encoded in an instruction register (or other circuitry maintaining instructions) or data values comprising memory locations, which in turn comprise values utilized as instructions. The memory locations may further comprise a memory location that is external to the CPU. Such CPU-external components may be embodied as one or more of a field-programmable gate array (FPGA), read-only memory (ROM), programmable read-only memory (PROM), erasable programmable read-only memory (EPROM), random access memory (RAM), bus-accessible storage, network-accessible storage, etc.

These machine-executable instructions may be stored on one or more machine-readable mediums, such as CD-ROMs or other type of optical disks, floppy diskettes, ROMs, RAMs, EPROMs, EEPROMs, magnetic or optical cards, flash memory, or other types of machine-readable mediums suitable for storing electronic instructions. Alternatively, the methods may be performed by a combination of hardware and software.

In another embodiment, a microprocessor may be a system or collection of processing hardware components, such as a microprocessor on a client device and a microprocessor on a server, a collection of devices with their respective microprocessor, or a shared or remote processing service (e.g., "cloud" based microprocessor). A system of microprocessors may comprise task-specific allocation of processing tasks and/or shared or distributed processing tasks. In yet another embodiment, a microprocessor may execute software to provide the services to emulate a different microprocessor or microprocessors. As a result, a first microprocessor, comprised of a first set of hardware components, may virtually provide the services of a second microprocessor whereby the hardware associated with the first microprocessor may operate using an instruction set associated with the second microprocessor.

While machine-executable instructions may be stored and executed locally to a particular machine (e.g., personal computer, mobile computing device, laptop, etc.), it should be appreciated that the storage of data and/or instructions and/or the execution of at least a portion of the instructions may be provided via connectivity to a remote data storage and/or processing device or collection of devices, commonly known as "the cloud," but may include a public, private, dedicated, shared and/or other service bureau, computing service, and/or "server farm."

Examples of the microprocessors as described herein may include, but are not limited to, at least one of Qualcomm® Snapdragon® 800 and 801, Qualcomm® Snapdragon® 610 and 615 with 4G LTE Integration and 64-bit computing, Apple® A7 microprocessor with 64-bit architecture, Apple® M7 motion comicroprocessors, Samsung® Exynos® series, the Intel® Core™ family of microprocessors, the Intel® Xeon® family of microprocessors, the Intel® Atom™ family of microprocessors, the Intel Itanium® family of microprocessors, Intel® Core® i5-4670K and i7-4770K 22 nm Haswell, Intel® Core® i5-3570K 22 nm Ivy Bridge, the AMD® FX™ family of microprocessors, AMD® FX-4300, FX-6300, and FX-8350 32 nm Vishera, AMD® Kaveri microprocessors, Texas Instruments® Jacinto C6000™ automotive infotainment microprocessors, Texas Instruments® OMAP™ automotive-grade mobile microprocessors, ARM® Cortex™-M microprocessors, ARM® Cortex-A and ARM926EJ-S™ microprocessors, other industry-equivalent microprocessors, and may perform computational functions using any known or future-developed standard, instruction set, libraries, and/or architecture.

Any of the steps, functions, and operations discussed herein can be performed continuously and automatically.

The exemplary systems and methods of this invention have been described in relation to communications systems and components and methods for monitoring, enhancing, and embellishing communications and messages. However, to avoid unnecessarily obscuring the present invention, the preceding description omits a number of known structures and devices. This omission is not to be construed as a limitation of the scope of the claimed invention. Specific details are set forth to provide an understanding of the present invention. It should, however, be appreciated that the present invention may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components or portions thereof (e.g., microprocessors, memory/storage, interfaces, etc.) of the system can be combined into one or more devices, such as a server, servers, computer, computing device, terminal, "cloud" or other distributed processing, or collocated on a particular node of a distributed network, such as an analog and/or digital telecommunications network, a packet-switched network, or a circuit-switched network. In another embodiment, the components may be physical or logically distributed across a plurality of components (e.g., a microprocessor may comprise a first microprocessor on one component and a second microprocessor on another component, each performing a portion of a shared task and/or an allocated task). It will be appreciated from the preceding description, and for reasons of computational efficiency, that the components of the system can be arranged at any location within a distributed network of components without affecting the operation of the system. For example, the various components can be located in a switch such as a PBX and media server, gateway, in one or more communications devices, at one or more users' premises, or some combination thereof. Similarly, one or more functional portions of the system could be distributed between a telecommunications device(s) and an associated computing device.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

Also, while the flowcharts have been discussed and illustrated in relation to a particular sequence of events, it should be appreciated that changes, additions, and omissions to this sequence can occur without materially affecting the operation of the invention.

A number of variations and modifications of the invention can be used. It would be possible to provide for some features of the invention without providing others.

In yet another embodiment, the systems and methods of this invention can be implemented in conjunction with a special purpose computer, a programmed microprocessor or microcontroller and peripheral integrated circuit element(s), an ASIC or other integrated circuit, a digital signal microprocessor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this invention. Exemplary hardware that can be used for the present invention includes computers, handheld devices, telephones (e.g., cellular, Internet enabled, digital, analog, hybrids, and others), and other hardware known in the art. Some of these devices include microprocessors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein as provided by one or more processing components.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this invention is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this invention can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Embodiments herein comprising software are executed, or stored for subsequent execution, by one or more microprocessors and are executed as executable code. The executable code being selected to execute instructions that comprise the particular embodiment. The instructions executed being a constrained set of instructions selected from the discrete set of native instructions understood by the microprocessor and, prior to execution, committed to microprocessor-accessible memory. In another embodiment, human-readable "source code" software, prior to execution by the one or more microprocessors, is first converted to system software to comprise a platform (e.g., computer, microprocessor, database, etc.) specific set of instructions selected from the platform's native instruction set.

Although the present invention describes components and functions implemented in the embodiments with reference to particular standards and protocols, the invention is not limited to such standards and protocols. Other similar standards and protocols not mentioned herein are in existence and are considered to be included in the present invention. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present invention.

The present invention, in various embodiments, configurations, and aspects, includes components, methods, processes, systems and/or apparatus substantially as depicted and described herein, including various embodiments, subcombinations, and subsets thereof. Those of skill in the art will understand how to make and use the present invention after understanding the present disclosure. The present invention, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and\or reducing cost of implementation.

The foregoing discussion of the invention has been presented for purposes of illustration and description. The foregoing is not intended to limit the invention to the form or forms disclosed herein. In the foregoing Detailed Description for example, various features of the invention are grouped together in one or more embodiments, configurations, or aspects for the purpose of streamlining the disclosure. The features of the embodiments, configurations, or aspects of the invention may be combined in alternate embodiments, configurations, or aspects other than those discussed above. This method of disclosure is not to be interpreted as reflecting an intention that the claimed invention requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the invention.

Moreover, though the description of the invention has included description of one or more embodiments, configurations, or aspects and certain variations and modifications, other variations, combinations, and modifications are within the scope of the invention, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

What is claimed is:

1. A method for optimizing an input feedstock change to a manufacturing process, the method comprising:

receiving, by a processor, a first set of input controls, wherein the first set of input controls include a first input feedstock change command;

receiving, by the processor, a first set of output parameters that correspond to the first set of input controls;

determining, by the processor, at least one lag time-period between initiation of the first input feedstock change command and detection of a steady state condition in the first set of output parameters, wherein the at least one lag time-period is based on monitoring variations in the first set of output parameters during a transition period;

applying, by the processor, a predictive model trained on historical process data to generate a second set of input controls during a second input feedstock change command, the second set of input controls configured to reduce a duration of the transition period to reach the steady state condition; and regulating in real-time, by the processor, a feedstock rate into a manufacturing reactor based on the second set of input controls.

2. The method of claim 1, further comprising initializing, by the processor, the predictive model using the first set of input controls, the first set of output parameters, and the at least one lag time-period during the transition period, wherein initializing the predictive model comprises selecting a plurality of features of the first set of input controls, the first set of output parameters, and the at least one lag time-period during the transition period for constructing the predictive model.

3. The method of claim 1, further comprising modifying, by the processor, the first set of input controls at a first time stamp and modifying the second set of input controls at a second time stamp, wherein the second time stamp is later than the first time stamp.

4. The method of claim 1, wherein the first set of input controls is selected from a plurality of input controls to the manufacturing process using at least one of stepwise regression, recursive feature elimination, lasso regression, variance influence factor, and mutual information algorithm.

5. The method of claim 1, further comprising determining, by the processor, the at least one lag time-period using linear regression with an r-squared metric.

6. The method of claim 1, wherein the second set of input controls optimizes that at least one lag-time period so as to shorten a time period to reach the steady state condition in the manufacturing process.

7. The method of claim 1, wherein the predictive model comprises at least one non-linear relationship between the first set of input controls and a first set of output measurements.

8. The method of claim 1, wherein the predictive model is trained with input of crude oil changes using at least two different types of crude oil in a crude distillation unit.

9. The method of claim 8, wherein the first set of output parameters are received from one or more sensing devices.

10. The method of claim 9, wherein the one or more sensing devices measure the manufacturing process comprising a crude distillation unit.

11. The method of claim 1, wherein the second set of input controls are transmitted in real-time to the second set of input controls.

12. The method of claim 1, wherein the predictive model is evaluated based on a plurality of differences between the first set of output parameters effected by one of the first set of input controls.

13. The method of claim 1, further comprising providing, by the processor, the second set of input controls when a time period taken to reach to the steady state is within a desired level, when provided with a same or similar control inputs as the first set of control inputs.

14. The method of claim 1, wherein the predictive model is trained based on a plurality of linear and non-linear relationships, wherein the plurality of linear and non-linear relationships are associated with a type of crude oil in a crude oil distillation unit.

15. The method of claim 1, further comprising utilizing, by the processor the predictive model to determine a lag period for each of the first set of input controls.

16. The method of claim 2, wherein selecting the plurality of features includes at least one of: variable selection, attribute selection and variable subset selection.

17. A method of a manufacturing process, the method comprising:

receiving, by a processor, an input feedstock change command;

receiving, by the processor, a first set of input controls, wherein the first set of input controls comprises one of a physical input, a heat input, a pressure input, or a rate of feedstock that are used to affect a chemical reaction;

receiving, by the processor, a first set of output parameters that correspond to the first set of input controls;

determining at least one lag time-period between initiation of the input feedstock change command and detection of a steady state condition in the first set of output parameters, wherein the at least one lag time-period is based on monitoring variations in the first set of output parameters during a transition period;

applying, by the processor, a predictive model trained on historical process data to generate a second set of input controls during a second input feedstock change command, such that a product produced by the manufacturing process remains constant; and regulating in real-time, by the processor, a feedstock rate into a manufacturing reactor based on the second set of input controls.

18. The method of claim 17 wherein the input feedstock change comprises at least one of composition, grade, temperature, pressure, or impurities of the input feedstock.

19. The method of claim 17, further comprising providing, by the processor, the second set of input controls when a time period taken to reach to the steady state conditions is within a desired level, when provided with a same or similar control inputs as the first set of control inputs.

20. The method of claim 17, wherein the predictive model is trained based on a plurality of linear and non-linear relationships associated with more than one crude oil data sets.

* * * * *